(12) United States Patent
Pokrovsky

(10) Patent No.: US 9,087,398 B2
(45) Date of Patent: Jul. 21, 2015

(54) SYSTEM AND METHOD FOR COMPRESSING BOUNDING BOX DATA AND PROCESSOR INCORPORATING THE SAME

(71) Applicant: Nvidia Corporation, Santa Clara, CA (US)

(72) Inventor: Andrei Pokrovsky, Bellevue, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 344 days.

(21) Appl. No.: 13/706,652

(22) Filed: Dec. 6, 2012

(65) Prior Publication Data

US 2014/0160151 A1 Jun. 12, 2014

(51) Int. Cl.
*G06T 11/00* (2006.01)
*G06T 17/00* (2006.01)
*G06T 11/40* (2006.01)

(52) U.S. Cl.
CPC .................. *G06T 17/00* (2013.01); *G06T 11/40* (2013.01); *G06T 2210/12* (2013.01)

(58) Field of Classification Search
CPC ......... G06T 11/00; G06T 11/40; G06T 17/00; G06T 2210/12
USPC .......... 345/622, 623, 628, 643, 555; 708/503; 382/232–253; 341/51–59
IPC .................. G06T 17/00,2210/12, 11/11, 11/40
See application file for complete search history.

(56) References Cited

U.S. PATENT DOCUMENTS

| | | | |
|---|---|---|---|
| 2002/0194239 A1* | 12/2002 | Pangal | 708/498 |
| 2005/0138101 A1* | 6/2005 | Tang et al. | 708/620 |
| 2007/0257824 A1* | 11/2007 | Harada et al. | 341/51 |
| 2008/0148200 A1* | 6/2008 | Von Mueffling et al. | 716/5 |
| 2009/0030960 A1* | 1/2009 | Geraghty et al. | 708/203 |
| 2009/0169119 A1* | 7/2009 | Wegener | 382/232 |
| 2011/0191653 A1* | 8/2011 | Zeng et al. | 714/763 |
| 2013/0262539 A1* | 10/2013 | Wegener | 708/204 |
| 2014/0047199 A1* | 2/2014 | Kim | 711/154 |

* cited by examiner

*Primary Examiner* — Ke Xiao
*Assistant Examiner* — Kim-Thanh T Tran

(57) ABSTRACT

Methods of compressing (and decompressing) bounding box data and a processor incorporating one or more of the methods. In one embodiment, a method of compressing such data includes: (1) generating dimension-specific multiplicands and a floating-point shared scale multiplier from floating-point numbers representing extents of the bounding box and (2) substituting portions of floating-point numbers representing a reference point of the bounding box with the dimension-specific multiplicands to yield floating-point packed boundary box descriptors, the floating-point shared scale multiplier and the floating-point packed boundary box descriptors together constituting compressed bounding box data.

20 Claims, 3 Drawing Sheets

SYSTEM AND METHOD FOR COMPRESSING BOUNDING BOX DATA AND PROCESSOR INCORPORATING THE SAME

TECHNICAL FIELD

This application is directed, in general, to data processing and storage and, more specifically, to a system and method for compressing bounding boxes and a processor incorporating the same.

BACKGROUND

Bounding shapes are shapes of at least two dimensions that contain part or all of at least one object and are often employed to accelerate the performance of, certain tests with respect to that which they contain. Bounding shapes are advantageous because they have simpler geometries than that which they contain and therefore simplify the tests. Common two-dimensional (2D) bounding shapes include bounding rectangles and circles. Three-dimensional (3D) bounding shapes are called bounding volumes and commonly include cuboids, spheres, ellipsoids, cylinders and slabs. The term, "bounding box," includes both (2D) rectangles and (3D) cuboids. Bounding geometries may be used in combination, perhaps in a hierarchical tree structure, to contain objects having intricate geometries.

Bounding shapes may be used, for example, to perform collision detection, ray-intersection tests in the course of ray tracing, viewing-frustum tests in the course of graphics rendering and bounds compression for conservative rendering culling algorithms. As stated above, since a bounding shape necessarily encompasses that which it contains, if two bounding shapes do not collide, that which they contain cannot collide, and if a ray or viewing frustum does not intersect a bounding shape, it cannot intersect anything contained within the bounding shape.

An axis-aligned bounding box (AABB) is a hounding box (a rectangle or a cuboid) that is aligned with arbitrary axes extending from an origin in a given Cartesian coordinate system. An oriented bounding box (ORB) is a bounding box (a rectangle or a cuboid) that is aligned with an object it contains. In an N-dimensional coordinate system, a bounding box (either the AABB or OBB kind) is typically represented by N numbers indicating the position (e.g., the center) of the bounding box relative to the origin or an object it contains and N numbers indicating the size of the bounding box in each of its N dimensions (called the "extent"). In binary single-precision floating-point representation, each of the N numbers occupies 32 bits, or our bytes, resulting in total of 24 bytes to represent the bounding box in its entirety. It is common to employ tens of thousands of bounding boxes in a given context, so generating, manipulating and using hounding boxes to perform tests can consume significant computer processing and memory resources.

SUMMARY

One aspect provides a method of compressing bounding box data, including: (1) generating dimension-specific multiplicands and a floating-point shared scale multiplier from floating-point numbers representing extents of the bounding box and (2) substituting portions of floating-point numbers representing a reference point of the bounding box with the dimension-specific multiplicands to yield floating-point packed boundary box descriptors, the floating-point shared scale multiplier and the floating-point packed boundary box descriptors together constituting compressed bounding box data.

Another aspect provides a method of decompressing bounding box data. In one embodiment, the method includes: (1) extracting dimension-specific multiplicands from floating-point packed boundary box descriptors, (2) generating floating-point numbers representing extents of a bounding box from a floating-point, shared scale multiplier and the dimension-specific multiplicands and (3) generating floating-point numbers representing a reference point of the bounding box from remaining portions of the floating-point packed boundary box descriptors.

Another aspect provides a processor. In one embodiment, the processor includes: (1) an extent encoder operable to generate dimension-specific multiplicands and a floating-point shared scale multiplier from floating-point numbers representing extents of a first bounding box, (2) a packer associated with the extent encoder and operable to substitute portions of mantissas of floating-point numbers representing a reference point of the first bounding box with the dimension-specific multiplicands to yield floating-point packed boundary box descriptors, (3) an extractor associated with the packer and configured to extract the dimension-specific multiplicands from the floating-point packed boundary box descriptors and (4) an extent decoder associated with the extractor and configured to generate floating-point numbers representing extents of a second bounding box from the floating-point shared scale multiplier and the dimension-specific multiplicands, the portions of the floating-point packed boundary box descriptors constituting floating-point numbers representing a reference point of the second bounding box.

BRIEF DESCRIPTION

Reference is now made to the following descriptions taken in conjunction with the accompanying drawings, in which.

DETAILED DESCRIPTION

Figure 1:
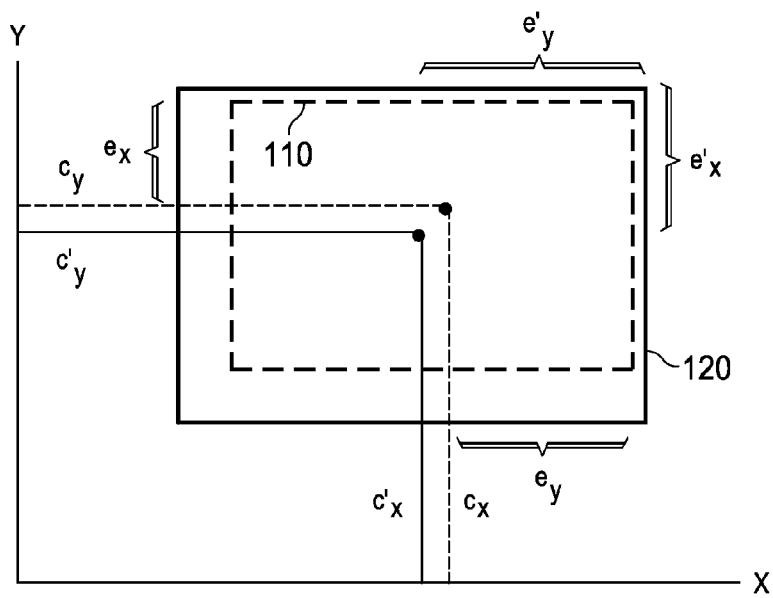
FIG. 1 is a diagram showing first and second 2D bounding boxes and numbers representing reference points and extents of the first and second bounding boxes.

As stated above, the six N numbers conventionally required to represent a bounding box in its entirety in binary single-precision floating-point, representation occupy a total of 24 bytes. Given that tens of thousands of bounding boxes (or even more) may be involved in a given test, generating, manipulating and using bounding boxes to perform tests can consume significant computer processing and memory resources.

It is realized herein that the conventional representation, while more than adequate in terms of precision, is needlessly consumptive of processing and storage resources. It is further realized that since the extents of a given bounding box tend to be close to one another in terms of their scale, some of the precision can be sacrificed without losing the bounding box's essential function (that of facilitating relatively efficient tests regarding one or more contained objects). The result is typically a close, more conservative approximation of the bounding box that requires substantially less data. (In rare instances, precision whatsoever is lost.) In other words, it is realized that the data representing a bounding box (which may be termed a first bounding box) may be encoded to yield compressed bounding box data, and that this compressed hounding box data may then be decoded to yield data most often representing an approximation of the first bounding box (which may be termed a second bounding box). It is realized that the approximation in the second bounding box is acceptable, because the first bounding box is itself a conservative approximation of that which it contains.

Accordingly, introduced herein are various embodiments of a hounding box data compressing/decompressing processor and related methods of compressing and decompressing. In embodiments to illustrated and described, compression is carried out by determining a shared scale multiplier appropriate for the extents of a bounding box (two in the case of a 2D bounding box, and three in the case of a all hounding box). The shared scale multiplier becomes part of the compressed bounding box data. Then, dimension-specific multiplicands are determined for each of the extents. Room is made for the multiplicands in the numbers representing a reference point (e.g., a center or a corner) of the bounding box (two in the case of a 2D bounding box, and three in the case of a 3D bounding box) by removing bits from the numbers (typically resulting in a decrease in their precision). The multiplicands are packed into the numbers, making them floating-point packed bounding box descriptors, which together with the shared scale multiplier then constitute the compressed bounding box data.

In certain embodiments, the multiplicands are eight bits apiece, an the room is made in each of the three numbers representing the reference point by dropping the eight least-significant bits (LSBs). In various embodiments, the compressed bounding box data consists of three single-precision floating point numbers and a single 24-bit floating-point number, totaling 15 bytes and representing a 37.5% compression as compared to the 24 bytes conventionally required.

Decompression involves extracting the multiplicands from the floating-point packed bounding box descriptors and applying the shared scale multiplier to yield the numbers representing the extents. Their multiplicands having been unpacked, the remaining portions of the floating-point bounding box descriptors now yield the numbers representing the reference point.

In various embodiments, the processor and methods are designed to allow bounding boxes to be compressed or decompressed independent of other bounding boxes, which is particularly advantageous in the context of dynamically adjustable trees. Bounding boxes are inherently independent of one another, because they are defined with reference to a single, absolute origin and not relative to one another. The processor and methods do not compromise this independence in the name of further compression. Thus, a "child" bounding box in a bounding box tree can be compressed or decompressed without having to operate on its "parent" bounding box.

In certain embodiments, the processor is a single-instruction multiple-data (SIMD) processor, and the methods are amenable to being carried out in such an architecture. Each dimension of the bounding box can be processed in its own pipeline, with minimal dependency upon the results of processing carried out in other pipelines.

The following description is made with respect to AABBs. However, those skilled in the pertinent art will readily be able to apply the description to OBBs.

FIG. 1 is a diagram showing first and second two-dimensional AABBs and numbers representing reference points and extents of the first and second. AABBs $110$, $120$. The second. AABB $120$ is typically a more conservative approximation of the first AABB $110$. FIG. 1 represents this fact by illustrating the second AABB $120$ as being larger than the first AABB $110$. However, FIG. 1 greatly exaggerates the size difference; the second. AABB $120$ may, in some cases, be a fraction of a percent or thereabout larger in area than the first AABB $110$.

Because the first AABB $110$ is 2D, two numbers, $c_X$ and $c_Y$, are used to identify a reference point of the first AABB $110$. In the embodiment of FIG. 1, the reference point is the center of the first AABB $110$. In an alternative embodiment, the reference point is a corner of the first AABB $110$. In another alternative embodiment, the reference point is a point on an edge of the first AABB $110$. Likewise, two numbers, $e_X$ and $e_Y$ are used to identify the extents of the first AABB $110$ relative to its reference point (i.e., center). In the embodiment of FIG. 1, the extents extend from the center to an edge of the first AABB $110$. In an alternative embodiment, the extents extend between opposing edges of the first AABB $110$.

Because the second AABB $120$ is likewise 2D, two numbers, $c'_X$ and $c'_Y$, are used to identify its reference point (i.e., center). Likewise, two numbers, $e'_X$ and $e'_Y$, are used to identify the extents of the second AABB $120$.

It should be noted that FIG. 1 illustrates 2D AABBs for the sake of clarity. 3D AABBs would require FIG. 1 to illustrate three axes and six numbers per AABB, which would be more difficult to resolve visually.

Figure 2:
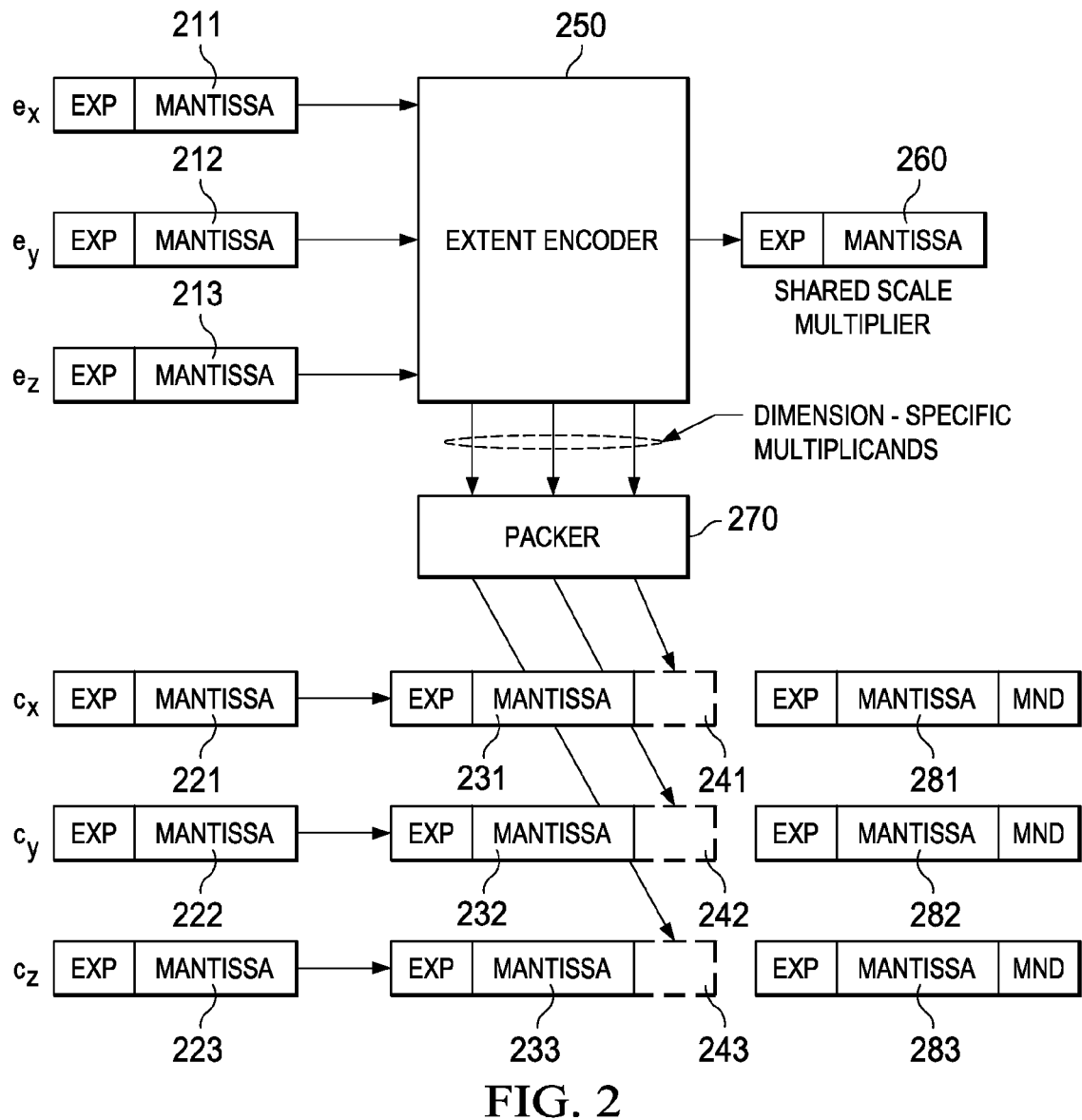
FIG. 2 is a highly conceptual diagram of one embodiment of a processor compressing 3D bounding box data.

FIG. 2 is a highly conceptual diagram of one embodiment of a processor compressing 3D AABB data. In the embodiment of FIG. 2, the 3D AABB data consists of three floating-point numbers representing extents of the AABB in three dimensions, $e_X$ $211$, $e_Y$ $212$, $e_Z$ $213$, and three floating-point numbers representing a reference point of the AABB (the center of the AABB in the illustrated embodiment), $c_X$ $221$, $c_Y$ $222$, $c_Z$ $223$. Each of the numbers $e_X$ $211$, $e_Y$ $212$, $e_Z$ $213$, $c_X$ $221$, $c_Y$ $222$, $c_Z$ $223$ has an exponent and a mantissa. In one embodiment, the numbers $e_X$ $211$, $e_Y$ $212$, $e_Z$ $213$, $c_X$ $221$, $c_Y$ $222$, $c_Z$ $223$ are expressed in IEEE binary single-precision form and occupy $32$ urns apiece.

An extent encoder $250$ of the processor is operable to receive the numbers $e_X$ $211$, $e_Y$ $212$, $e_Z$ $213$ (the floating-point numbers representing extents of a first AABB) and generate dimension-specific multiplicands and a floating-point shared scale multiplier based on them. In general, the extent encoder $250$ determines a shared scale multiplier for the numbers $e_X$ $211$, $e_Y$ $212$, $e_Z$ $213$ by computing it in a way that facilities decompression into a conservative bounding box. For example, in one embodiment, the dimension-specific multiplicands are eight bits each, and the extent encoder $250$ determines the shared scale multiplier as $\max(e_X, e_Y, e_Z)/255$ and determines the dimension-specific multiplicands as conservatively rounded-up values of $255*($each extent/shared scale multiplier$)$.

As will be recalled, the dimension-specific multiplicands are eventually packed with portions of the numbers $c_X$ $221$, $c_Y$ $222$, $c_Z$ $223$. In one embodiment, eight bits are set aside to accommodate the dimension-specific multiplicands. Therefore, in this embodiment, the extent encoder $250$ determines a shared scale multiplier that allows the dimension-specific multiplicands to be expressed in eight bits.

In the illustrated embodiment, the extent encoder $250$ assumes that the dimension-specific multiplicands are represented by the lowest eight bits of the numbers $e_X$ $211$, $e_Y$ $212$, $e_Z$ $213$ and therefore that their mantissas share a scale equaling the 15 most-significant bits of their mantissas. Accordingly, in the illustrated embodiment, the extent encoder $250$ yields (1) a shared scale multiplier 260 that reflects the most-significant bits and (2) three dimension-specific multiplicands of eight bits apiece.

A packer 270 of the processor is associated with the extent encoder 250. The packer is operable to substitute portions of the mantissas of the numbers $c_X$ 221, $c_Y$ 222, $c_Z$ 223 (the floating-point numbers representing the reference point of the first AABB) with the dimension-specific multiplicands to yield floating-point packed AABB descriptors. In the specific embodiment of FIG. 2, it can be seen that this substitution occurs by truncating the eight least significant bits from the numbers $c_X$ 221, $c_Y$ 222, $c_Z$ 223 to yield truncated numbers 231, 232, 233 having corresponding empty slots 241, 242, 243. The packer 270 then packs the dimension-specific multiplicands into the slots 241, 242, 243. In the embodiment of FIG. 2, the packer 270 packs the dimension-specific multiplicands into corresponding ones of the slots 241, 242, 243. The result is floating-point packed. AABB descriptors 281, 282, 283 containing the multiplicands (MNDs). The shared scale multiplier 260 and the floating-point packed AABB descriptors 281, 282, 283 together constitute compressed axis-aligned AABB data.

Figure 3:
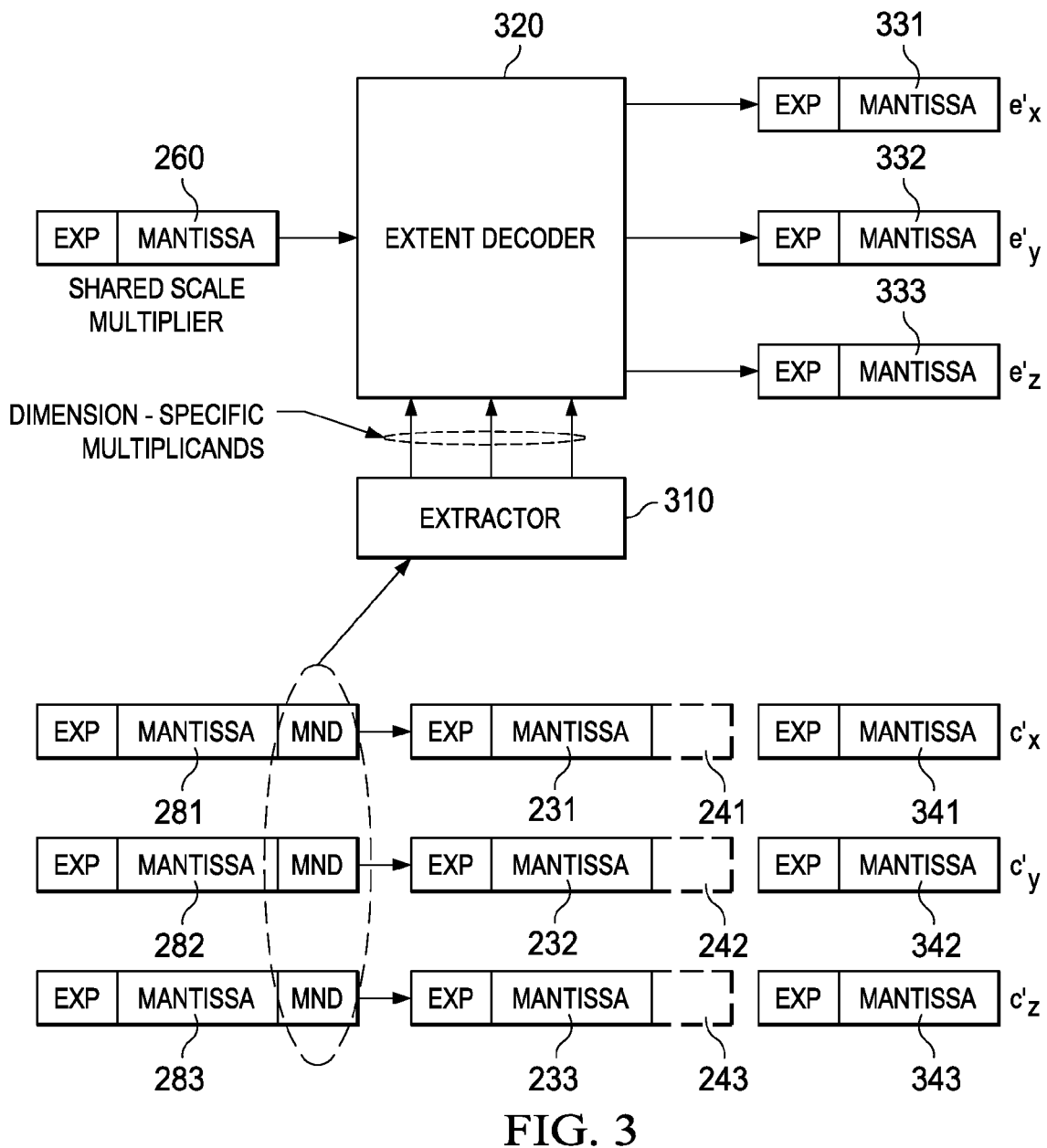
FIG. 3 is a highly conceptual diagram of one embodiment of a processor decompressing 3D bounding box data.

FIG. 3 is a highly conceptual diagram of one embodiment of a processor decompressing 3D AABB data. An extractor 310 of the processor is associated with the packer 270 of FIG. 2. The extractor 310 is configured to extract the dimension-specific multiplicands (MND) from the floating-point packed AABB descriptors 281, 282, 283, leaving slots 241, 242, 243. The numbers 231, 232, 233 remaining of the floating-point AABB descriptors become the floating-point numbers representing the reference point of a second AABB, i.e., the floating point numbers $c'_X$ 341, $C'_Y$ 342, $c'_Z$ 343. In the illustrated embodiment, the second AABB is often, but not always, slightly larger and therefore more conservative, than the first AABB.

An extent decoder 320 is associated with the extractor 310. The extent decoder 320 is configured to generate floating-point numbers representing the extents $e'_X$ 331, $e'_Y$ 332, $e'_Z$ 333 of a second axis-aligned AABB from the floating-point shared scale multiplier 260 and the dimension-specific multiplicands received from the extractor 310. Consequently, the numbers $e'_X$ 331, $e'_Y$ 332, $e'_Z$ 333, $c'_X$ 341, $c'_Y$ 342, $c'_Z$ 343 represent the second AABB.

In the context of a SIMD processor, the numbers $c'_X$ 341, $c'_Y$ 342, $c'_Z$ 343 may be decompressed by loading them directly as a three-floating-point vector without adjustment. The multiplicands may be loaded as a three-integer vector with a 0xFF mask and converted to floating-point form (via one SIMD instruction), followed by a multiply by the shared scale multiplier reconstructed from a 24 bit floating-point number. An additional constant multiplication may then be performed to increase accuracy, where desired.

In various embodiments, bits are allocated differently such that the numbers representing the reference point have an increased precision, and the numbers representing the extents have a decreased precision, or vice versa. It is realized herein that precision may be lost in the representation of a boundary box by exploiting the fact that extents are commonly within the same scale range, or otherwise that the precision does not matter much since the bounds are conservative.

The particular embodiments described above are byte-aligned, which makes decompression more straightforward. In one embodiment, byte-alignment is further enhanced by storing the shared scale multiplier as a full 32-bit floating-point number.

Figure 4:
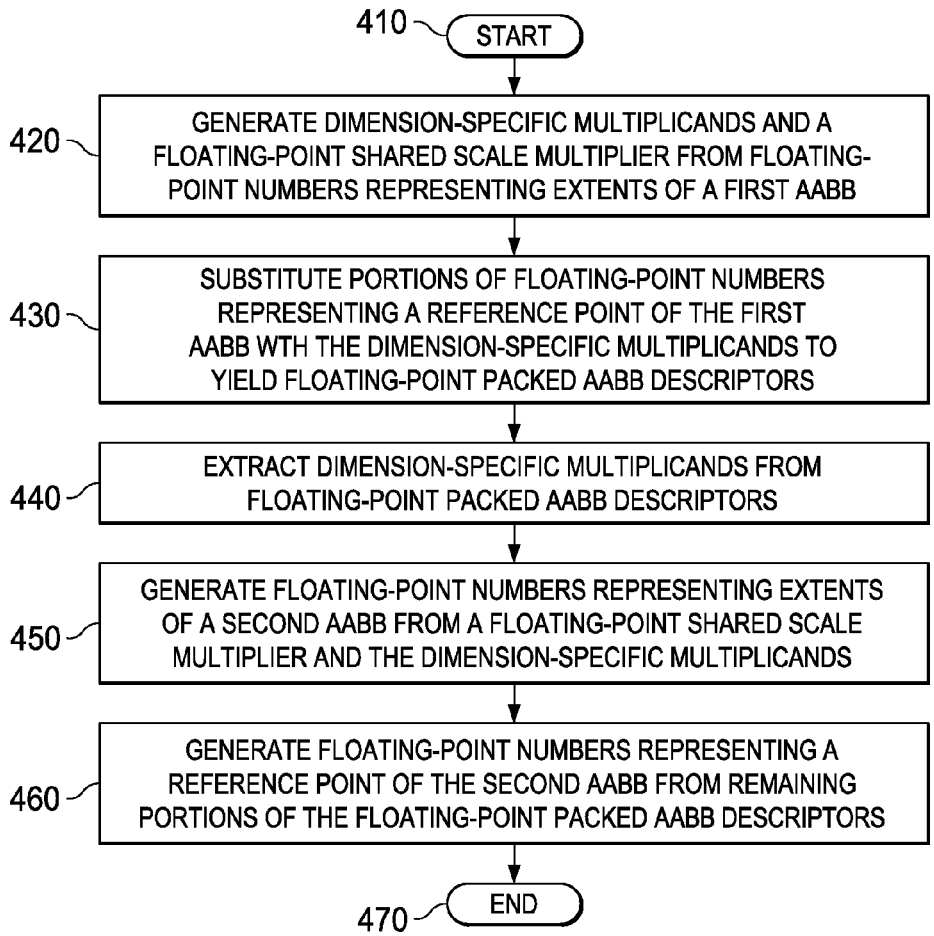
FIG. 4 is a flow diagram of one embodiment of a method of compressing and decompressing bounding box data.

FIG. 4 is a flow diagram of one embodiment of a method of compressing and decompressing AABB data. The method begins in a start step 410, in which compression is initially carried out. In a step 420, dimension-specific multiplicands and a floating-point shared scale multiplier are generated from floating-point numbers representing extents of a first AABB. In a step 430, portions of floating-point numbers representing a reference point of the first. AABB are substituted with the dimension-specific multiplicands to yield floating-point packed AABB descriptors. The floating-point shared scale multiplier and the floating-point packed AABB descriptors together constitute compressed AABB data.

In a step 440, decompression begins. In the step 440, dimension-specific multiplicands are extracted from the floating-point packed AABB descriptors. In a step 450, floating-point numbers representing extents of a second AABB are generated from a floating-point shared scale multiplier and the dimension-specific multiplicands. In a step 460, floating-point numbers representing a reference point of the second AABB are generated from remaining portions of the floating-point packed AABB descriptors. The method ends in an end step 470.

Those skilled in the art to which this application relates will appreciate that other and further additions, deletions, substitutions and modifications may be made to the described embodiments.

What is claimed is:

1. A method of compressing bounding box data, comprising:
generating, by a processor, dimension-specific multiplicands and a floating-point shared scale multiplier from floating-point numbers representing extents of said bounding box; and
substituting, by said processor, portions of floating-point numbers representing a reference point of said bounding box with said dimension-specific multiplicands to yield floating-point packed boundary box descriptors, said floating-point shared scale multiplier and said floating-point packed boundary box descriptors together constituting compressed bounding box data.

2. The method as described in claim 1 wherein said floating-point shared scale multiplier equals a maximum of said extents divided by 255.

3. The method as described in claim 1 wherein said substituting comprises substituting lowest significant bits of said floating-point numbers representing said reference point with said dimension-specific multiplicands.

4. The method as described in claim 1 wherein said substituting comprises substituting portions of mantissas of said floating-point numbers representing said reference point with said dimension-specific multiplicands.

5. The method as described in claim 1 wherein said dimension-specific multiplicands are eight bits in length.

6. The method as described in claim 1 wherein each of said floating-point numbers representing said extents and said reference point is 32 bits in length.

7. The method as described in claim 1 wherein said reference point is a center of said bounding box.

8. A method of decompressing bounding box data, comprising:
extracting, by a processor, dimension-specific multiplicands from floating-point packed boundary box descriptors;
generating, by said processor, floating-point numbers representing extents of a bounding box from a floating-point shared scale multiplier and said dimension-specific multiplicands; and generating, by said processor floating-point numbers representing a reference point of said bounding box from remaining portions of said floating-point packed boundary box descriptors.

9. The method as described in claim 8 wherein said floating-point shared scale multiplier equals a maximum of said extents divided by 255.

10. The method as described in claim 8 wherein said extracting comprises extracting said dimension-specific multiplicands from lowest significant bits of said floating-point numbers representing said reference point.

11. The method as described in claim 8 wherein said extracting comprises extracting said dimension-specific multiplicands from portions of mantissas of said floating-point numbers representing said reference point.

12. The method as described in claim 8 wherein said dimension-specific multiplicands are eight bits in length.

13. The method as described in claim 8 wherein each of said floating-point numbers representing said extents and said reference point is 32 bits in length.

14. The method as described in claim 8 wherein said reference point is a center of said bounding box.

15. A processor, comprising:
an extent encoder operable to generate dimension-specific multiplicands and a floating-point shared scale multiplier from floating-point numbers representing extents of a first bounding box;
a packer associated with said extent encoder and operable to substitute portions of mantissas of floating-point numbers representing a reference point of said first bounding box with said dimension-specific multiplicands to yield floating-point packed boundary box descriptors;
an extractor associated with said packer and configured to extract said dimension-specific multiplicands from said floating-point packed boundary box descriptors; and
an extent decoder associated with said extractor and configured to generate floating-point numbers representing extents of a second bounding box from said floating-point shared scale multiplier and said dimension-specific multiplicands, said portions of said floating-point packed boundary box descriptors constituting floating-point numbers representing a reference point of said second bounding box.

16. The processor as described in claim 15 wherein said floating-point shared scale multiplier equals a maximum of said extents divided by 255.

17. The processor as described in claim 15 wherein said packer is further operable to substitute lowest significant bits of said floating-point numbers representing said reference point with said dimension-specific multiplicands.

18. The processor as described in claim 15 wherein said dimension-specific multiplicands are eight bits in length.

19. The processor as described in claim 15 wherein each of said floating-point numbers representing said extents and said reference point of said first bounding box is 32 bits in length.

20. The processor as described in claim 15 wherein said reference point of said first bounding box is a center of said first bounding box and said reference point of said second bounding box is a center of said second bounding box.

* * * * *